United States Patent [19]

Schoenberg

[11] 4,034,000
[45] July 5, 1977

[54] DIFUNCTIONAL POLYMERIC DIENES

[75] Inventor: Emanuel Schoenberg, Akron, Ohio

[73] Assignee: The Goodyear Tire & Rubber Company, Akron, Ohio

[22] Filed: July 1, 1970

[21] Appl. No.: 51,715

Related U.S. Application Data

[63] Continuation of Ser. No. 310,910, Sept. 23, 1963, abandoned, which is a continuation-in-part of Ser. No. 9,161, Feb. 17, 1960, abandoned.

[52] U.S. Cl. .................. 260/502.6; 260/77.5 AP; 260/515 P; 260/537 R; 260/609 R; 260/618 R; 260/635 K; 260/650 R; 260/654 R; 260/665 R; 260/635 R

[51] Int. Cl.² .............. C07C 154/00; C07C 51/15; C07C 20/00; C07C 31/18

[58] Field of Search ........ 260/635 E, 635 R, 502.6, 260/537 R

[56] References Cited

UNITED STATES PATENTS

| | | | |
|---|---|---|---|
| 2,773,092 | 12/1956 | Carley et al. | 260/635 E |
| 2,816,916 | 12/1957 | Frank et al. | 260/665 R |
| 2,966,526 | 12/1960 | Hansley et al. | 260/665 R |
| 3,055,952 | 9/1962 | Goldberg | 260/635 E |

*Primary Examiner*—Joseph E. Evans
*Attorney, Agent, or Firm*—F. W. Brunner; J. D. Wolfe

[57] ABSTRACT

This invention relates to a method of making polymeric materials having isocyanate reactive groups by polymerizing conjugated diolefins and other olefins with a lithium catalyst in the presence of an ether consisting of diethyl ether, dimethoxy ethane and tetrahydrofuran, then reacting the lithium polymeric adduct with a functionality imparting compound such as carbon dioxide, ethylene oxide, propylene oxide, aldehydes, ketones and carbon disulfide.

3 Claims, No Drawings

DIFUNCTIONAL POLYMERIC DIENES

This application is a continuation of application Ser. No. 310,910, filed Sept. 23, 1963 now abandoned which is a continuation-in-part of application Ser. No. 9,161, filed Feb. 17, 1960 now abandoned.

This invention relates to a method for preparing polymeric compounds and to the product thereof. More particularly, it relates to the preparation of polymeric conjugated dienes having functional end groups and especially to polymers having a molecular weight in excess of about 370.

The polymeric adducts to which the functional imparting compounds are attached may be represented structually as follows:

Then the reaction of the functional imparting compound may be represented as follows:

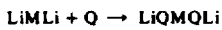

Then LiQMQLi is treated to replace the Li atom with hydrogen. This reaction may be represented as follows:

Where Q is the functional imparting compound, ethylene oxide, then the structural formula is:

where M is a bivalent hydrocarbon radical selected from the group consisting of

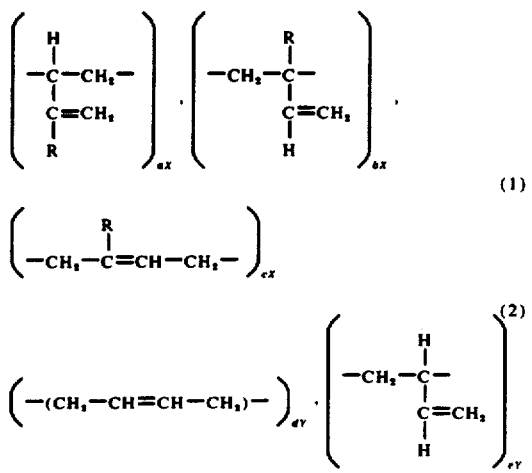

(3) mixtures of (1) and (2), and, (4) copolymers of (1) and (2) together and individually with up to 40% syrene by weight of M where R is $C_1$–$C_8$ alkyl; X and Y are integers which indicate the weight of (1) and (2), respectively, present in M; the value of $a$ ranges from about 0.40 to 0.70, $b$ from about 0.10 to 0.40, $c$ from about 0 to 0.40, $d$ from about 0.1 to 0.4, and $e$ from about 0.6 to 0.9, with the proviso that $a + b + c = 1$ and $d + e = 1$.

The hydroxyl-terminated polymeric hydrocarbons of the present case are, in general, prepared from hydrocarbon monomers such as butadiene, isoprene, and 2-ethyl butadiene which possess conjugated unsaturation. Hydrocarbon monomers which have unconjugated ethylenic unsaturation such as isobutylene, propylene, butene, and cyclohexene are generally not useful because they are not anionically polymerizable. Styrene, which has an unusually active vinyl group, is an exception and may be copolymerized with the conjugated dienes. Monomers such as acrylonitrile, ethylacrylate, and methyl methacrylate are unsuitable because the cyano and ester groups are reactive with the organic metallic groups present. Thus the bivalent radical M is made up of units of a single anionically polymerizable conjugated diene (such as isoprene) or units of several anionically polymerizable conjugated dienes (randomly distributed or in blocks).

High molecular weight compounds have functional end groups having recently become of great commercial interest, particularly in the polymer field as intermediates in the preparation of plastics, rubbers and related products. Thus, such difunctional compounds may be employed in the preparation of condensation polymers, lubricants, plasticizers, adhesives, rubbers and the like.

It is known that alkali metals such as sodium and potassium may be used in ether to polymerize diolefins, such as butadiene and isoprene to yield low molecular weight diene adducts which can be converted with carbon dioxide into diacids. In fact, U.S. Pat. No. 2,352,461 specifically teaches this concept. Also, this patent teaches that lithium will not function as a catalyst in ether solutions to yield those low molecular weight adducts which may be reacted with carbon dioxide to yield dicarboxylic salts. Also, this patent teaches that diethyl ether is an inoperative solvent for the polymerization of dienes with the alkali metals and the reaction of the diene adduct with carbon dioxide to yield a diacid salt.

Therefore, a broad object of this invention is to provide a method whereby a wide range of relatively high molecular weight lithium polydiene adducts may be obtained which are reactive with functionally imparting compounds to yield a polymeric compound having functional end groups characterized by high reactivity, for example, with organo diisocyanates to yield polyurethanes of a plastic and/or an elastomeric nature. Another object of this invention is to provide relatively high molecular weight lithium metal adducts of a polymerized conjugated diolefin which are reactive with functionality imparting compounds, such as ethylene oxide, to yield a relatively high molecular weight difunctional compound. Other objects and advantages of this invention will become apparent as the description proceeds.

The objects of this invention may be achieved by reacting a conjugated diolefin containing from 4 to 8 carbon atoms with finely divided lithium metal in the presence of a solvent selected from the class consisting of diethyl ether, dimethoxyethane and tetrahydrofuran at a temperature at least below about 30° C. and sufficiently low to yield a lithium polymeric diolefin adduct which is reactive with a functionality imparting compound to yield a compound with functional groups at each end of the polymer chain. Normally the optimum temperature at which the lithium metal adduct is formed is determined by the solvent used. For example, if the solvent is diethyl ether, then the temperature should be less than about 30° C. or otherwise the resulting lithium polymeric diolefin adduct on reaction with functionality imparting compounds will not yield a purely difunctional compound. On the other hand, if the temperature of the diethyl ether solution or dispersion of lithium and the diene is below about 0° C., the rate of reaction may become inordinately slow. With tetrahydrofuran the temperature should be no higher than about −10° C. and preferably no higher than about −20° C. while with dimethoxyethane the temperature should be no higher than about −30° C. If the temperature is higher than these limits when using these two solvents, the resulting metal polymeric diolefin adduct at least will be partially destroyed and thus will not be reactive with a functionality imparting compound and consequently the resulting polymers will have dead ends or be monofunctional. The formation of dead ends in the course of the reaction at temperatures in excess of those indicated herein is thought to be caused by the cleavage of the ether to form lithium alcoholates.

The molecular weight of the polymeric diolefin lithium metal adduct is determined primarily by the ratio of lithium metal to conjugated diolefin used. For example, where the ratio of lithium to isoprene is 1 to 2, the resulting lithium metal polyisoprene adduct will have a molecular weight in excess of about 350. On the other hand, if the lithium to isoprene mol ratio is about 1 to 4, the molecular weight will be about 1000. Similarly at mol ratios of 1 to 6 and 1 to 26 the molecular weight of the resulting adduct will be about 1400 and 3900, respectively. To further elaborate on the effect of variation of mol ratio of lithium to diolefin, applicant has obtained a molecular weight of about 1000 with a lithium to butadiene mol ratio of 1 to 4.6 and a butadiene adduct in excess of 2000 molecular weight with a lithium to butadiene mol ratio of 1 to 12.6.

Thus it should be noted that by varying the lithium metal to diene ratio, it is possible to prepare lithium polydiene adducts having a molecular weight ranging from about 400 to 13,000 but if the polyurethane derivative is to be elastomeric the molecular weight should be at least about 700. This is something that is impossible to do when using a hydrocarbon solvent since experience has demonstrated that in a hydrocarbon solvent the molecular weight of the resulting polymer is inordinately high. Hence, one of the real advantages of this invention is the discovery that the diene lithium adduct may be prepared having a specific molecular weight by controlling the rate of addition and the amount of diene charged to the reaction vessel. Thus for the first time it is possible to prepare difunctional materials having considerable unsaturation and a wide variety of molecular weights.

It is preferred that the lithium metal be in the form of a finely divided material having an average particle size of less than 50 microns and preferably less than 20 microns. Dispersions of this particle size may be obtained by employing any of the well-known methods for dispersing alkali metals, for instance, by placing the lithium metal in a suitable vessel in the presence of a hydrocarbon solvent such as petrolatum, dodecane, etc. and heating the mixture until the metal is molten and then dispersing it through vigorous agitation. A small amount of an emulsifier may be employed to facilitate the dispersing of the lithium metal. This should not be taken as indicating other well-known and suitable methods for preparing finely divided alkali metal dispersions may not also be employed, for instance, by means of ultrasonic vibrations.

It is essential that the lithium dispersion be added to the ether solvents in such a ratio as to yield a resulting mixture which contains no more than about 25 to 40% by weight of hydrocarbon on an ether basis. If this amount of hydrocarbon on an ether basis is exceeded, the resulting lithium polymeric diolefin adduct will not yield the desired difunctional compound and its molecular weight will be higher. Also, this amount of hydrocarbon tends to form compounds having dead ends or a single functional group if it has any. Thus it is essential that the solvent comprise at least about 60% by weight, and preferably more than 75% of at least one of the ethers selected from the class of diethyl ether, dimethoxyethane and tetrahydrofuran or a mixture of these ethers.

By the term "functionality imparting compound" or Q as used in this specification and the claims is meant a compound reactive with the lithium metal polymeric diolefin adduct to yield a polymer with reactive end groups. The preferred functionality imparting compounds are those leading to compounds having two reactive hydrogens and extendable by organo diisocyanate to yield a polyurethane elastomer having a dilute solution viscosity of at least 0.4. Examples of functionality imparting compounds useful in this invention are ethylene oxide, carbon dioxide, propylene oxide, sulfur dioxide, carbon disulfide, methoxy amine, ethylene imine, sulfur, oxygen, and benzene sulfonyl chloride, and the low molecular weight aldehydes and ketones.

When the lithium polymeric diolefin adduct of this invention is reacted with carbon dioxide usually in the form of crushed dry ice, a lithium dicarboxylic acid salt results. Similarly when methoxy amine is used in place of carbon dioxide the resulting compound will be a diamine. If carbon disulfide is used instead of carbon dioxide, the resulting compound will be bis-dithio acid salt. Similarly the use of sulfur will yield lithium dimercaptides. Use of functionality imparting compounds such as ethylene oxide, aldehydes, ketones, propylene oxide and oxygen yield alcoholates of lithium which then can be converted to alcohols by acidification; use of sulfonyl chlorides as a functionality imparting compound results in the formation of dichlorides. The functionality imparting compounds of this invention such as alkylene oxides, aldehydes and ketones are restricted to those that are relatively active; that is, those having less than about 10 carbon atoms and preferably less than about 5. Some specific examples of these compounds are butylene oxide, formaldehyde, acetaldehyde and acetone.

The conjugated diolefins which may be employed in this invention may range from the simplest diolefin; that is, butadiene containing 4 carbon atoms to diolefins containing up to 8 carbon atoms. Representative examples of such diolefins are: butadiene; the methyl substituted butadienes such as isoprene; dimethyl butadienes and ethyl butandienes; pentadienes, hexadienes and octadienes including styrene, as well as mixtures of these monomers with other polymerizable vinyl hydrocarbons.

It should be appreciated that the preferred results are obtained when this invention is practiced under essentially inert atmospheric conditions whereby oxygen, moisture and other impurities are excluded. Thus, the reaction described in this invention will normally be carried out employing the well-known inert atmospheric technique using inert gases, such as argon and helium to blanket the reactants and to exclude oxygen and moisture. It should be kept in mind though that although nitrogen is normally considered to be satisfactory for use as an inert atmosphere, nitrogen reacts with lithium under the conditions of this invention. Therefore, nitrogen is not as desirable as is argon or helium.

The use of condensed cyclic ring compounds such as naphthalene, biphenyl and diaryl ketones are known to form addition complexes with alkali metals and to be useful in facilitating the polymerization of conjugated diolefins in the presence of alkali metals. These compounds may be used in this invention also since they reduce the induction period necessary for the starting of the polymerization reaction to form the polymeric diene lithium adduct. When condensed cyclic ring compounds such as these are used in accordance with the teachings of this invention, the amount used should be limited to less than a molar equivalent for each molar equivalent of lithium used. Usually 1% on an equivalent basis is preferred. Although these condensed cyclic ring compounds may be used to enhance the results obtained, they are not necessary to the successful practice of this invention.

To specifically illustrate a preferred method for obtaining difunctional terminated polydienes which are reactive with organo diisocyanate to yield elastomeric polyurethanes, a finely divided dispersion of lithium metal and tetrahydrofuran is made by placing the lithium metal in a reactor equipped with a stirrer and under suitable inert atmospheric conditions (a positive stream of argon gas) and then cooling the tetrahydrofuran to less than −10° C. and slowly adding butadiene or another suitable diene while maintaining the temperature at least below −10° C. and preferably around about −30° C. Normally the amount of solvent used is between 5–20 milliliters or even higher for each gram of diolefin used. The addition of diolefin monomer, for instance butadiene, is continued until the desired molar ratio of lithium to monomer is obtained. Then the charging of the diene to the reactor is stopped and the functionality imparting compound, for example ethylene oxide or carbon disulfide, may be added immediately to the reaction vessel while controlling the temperature to prevent overheating and maintaining the temperature within the above temperature range.

If the lithium polydiene adduct molecular weight desired is around 1000 to 1500, normally the molar ratio of lithium to diene should be at least about 1 to 6. Of course, it is realized an actual molecular weight determination may be made in the conventional manner on a sample withdrawn from the reactor to check the molar ratio required to give a desired molecular weight.

The amount of functionality imparting compound added, for example, carbon dioxide or ethylene oxide, should be at least eqivalent on a molar basis to the amount of litium metal used to achieve the polymerization. Normally only a few minutes are required for the reaction between the adduct and functionality compound to go to completion after the addition of the last of the functionality imparting compound; then the free or unreacted lithium metal is destroyed preferably by the addition of methanol or other suitable low molecular weight alcohols. The neutralized product is then water-washed to recover the difunctional polymeric product free of lithium salts. Any free water or solvents in the washed product may be removed by distillation preferably under a vacuum. The reaction product obtained in this manner has a high reactivity with organo diisocyanate and is extendable to yield a polymeric product which may have elastomeric properties and a dilute solution viscosity of at least about 0.4. Thus, where ethylene oxide is used, the functional compound will be a diol and the extension product will be a polyurethane. On the other hand, if carbon disulfide is used instead of ethylene oxide the functional compound will be a lithium salt of a bisdithio acid containing two more carbon atoms than the metal polydiene adduct. The extension product of the bis-dithio acid, i.e. the polyester made therefrom with a diisocyanate will be a poly thio urethane. It should be apparent that the ethylene oxide terminated product contains 4 carbon atoms more than the adduct while a propylene oxide terminated product contains 6 carbon atoms more than the adduct. Also, it should be apparent that carbon dioxide or carbon disulfide termination of the lithiumpolydiene adduct will form a salt of lithium and this salt will have to be treated with an acid, such as sulfuric, to form the free dicarboxylic acid or the bis-dithio acid, respectively.

To illustrate the invention but without intent of limitation the following embodiments are set forth with all parts both in the examples and claims being by weight unless otherwise specified. Also, the dilute solution viscosity shown herein was determined at 30° C. on a solution consisting of 1 gram of the material dissolved in 100 milliliters of chloroform.

EXAMPLE I

To a reaction vessel equipped with an agitator, thermometer and graduated separatory funnel were added 600 parts of 1,2-dimethoxyethane, 10.5 parts of finely divided lithium metal. A total of 204 parts of isoprene was added to the reaction flask over a period of 4 hours and the temperature was maintained at about −40° C. while agitating vigorously and maintaining an atmosphere of inert gas, i.e. a helium or argon blanket. The reaction mixture changed from an initial light grey color to a greenish yellow color. As the reaction proceeded the mixture became more and more viscous. After all the isoprene was charged the agitation was continued for an additional 23 minutes.

To form a difunctional material the following termination reaction was performed: A total of 110 parts liquid ethylene oxide were then added to the reaction vessel over a period of 2 hours while maintaining the temperature at about −40° C. The color of the reaction mixture at the end of this period became a light grey. The reaction mixture was then allowed to warm up to room temperature. An excess of methanol was then added to decompose any residual unreacted lithium. Water was then added and the mixture neutralized with dilute hydrochloric acid. The mixture was then allowed to separate into a water solution of lithium salt and an organic fraction. The organic fraction was separated and dried over calcium sulfate. A total of 228 parts of an oily product was recovered from the organic fraction by evaporating the solvent. This product had a dilute solution viscosity of 0.026 and an hydroxyl equivalent of 216. This product (an equivalent weight) was reacted with an equivalent amount of methylene bis (4-phenylisocyanate). This resulted in a plastic material having a dilute solution viscosity of 0.4.

EXAMPLE II

A total of 620 parts of tetrahydrofuran, 5.2 parts of finely divided lithium metal, 204 parts of isoprene were employed. A total of 120 parts of ethylene oxide was employed for the termination reaction. These ingredients were mixed and reacted in accordance with the teachings of Example I. From the reaction products were isolated 231 parts of a viscous material with a dilute solution viscosity of 0.044 and an hydroxyl equivalent of 580. This product after reaction with an equivalent amount of methylene bis (4-phenyl isocyanate) produced a semi-rubbery material with a dilute solution viscosity of 0.58.

EXAMPLE III

A total of 888 parts of tetrahydrofuran, 2.4 parts of finely divided lithium metal was employed under the conditions of Example I. Then a total of 143 parts of isoprene was added over a period of 2½ hours while maintaining the temperature at −40° C. The reaction was terminated with 57 parts of ethylene oxide. There was recovered a total of 154 parts of a very viscous material which had a dilute solution viscosity of 0.07 and an hydroxyl equivalent of 721. This material was extended with an equivalent amount of methylene bis-(4-phenyl isocyanate) to form a rubbery product with a dilute solution viscosity of 0.63, expressed as the natural logarithm of the ratio of the viscosity of the solution to the solute divided by the solute concentration.

EXAMPLE IV

In this example the procedure of Example I was repeated except for the variations indicated hereinafter. A total of 1330 parts of tetrahydrofuran, 1.35 parts of finely divided lithium metal and 348 parts of isoprene were added to the reactor over a period of 5 hours while maintaining a temperature of between −30° and −40° C. The reaction was terminated by adding 53 parts of ethylene oxide. A total of 330 parts of a viscous oil having a dilute solution viscosity of 0.091 and a hydroxyl equivalent of 1990 was recovered. This product was extended with an equivalent amount of methylene bis-(4-phenyl isocyanate) to form a rubber which could be readily cured with conventional sulfur or peroxide rubber curing recipes.

EXAMPLE V

The general reaction procedure was the same as that used in Examples I to IV except for the fact that butadiene was used as monomer. The butadiene was introduced through a gas inlet tube which extended beneath the surface of the liquid. Tetrahydrofuran (1330 parts) and finely divided lithium (7.2 parts) were added to reactor and the lithium dispersed therein prior to start of the butadiene feed. The butadiene (260 parts) was added over a period of 3.5 hours at about −40° C. 40% of the reactor contents were forced under argon pressure onto an excess of crushed dry ice; to the rest of the material in the vessel were added 44 parts of ethylene oxide.

EXAMPLE VI

Ninety parts of a polymer diacid having a neutralization equivalent of 620 was isolated from the sulfuric acid acidified product formed in Example V when the dry ice reacted with the polyene-lithium adduct. The reaction of the ethylene oxide with the polybutadiene-lithium adduct in Example V yielded 136 parts of a viscous oil which had a dilute solution viscosity of 0.054 and an hydroxyl equivalent of 545. This polybutadienediol was extended with an equivalent amount of methylene bis (4-phenyl isocyanate) to yield a rubbery material with a dilute solution viscosity of 0.6. Infrared analysis of this polybutadiene diol indicates it to be of a predominatly 1,2 (syndiotactic) structure.

EXAMPLE VII

The reaction procedure of this example was essentially the same as that used in Example V except that 1330 parts of tetrahydrofuran, 3.5 parts of finely divided lithium metal were used and a total of 340 parts of butadiene were added over a period of 4 hours at −38° C. The reaction was terminated with 44 parts of ethylene oxide to yield 306 parts of a viscous oil which had a dilute solution viscosity of 0.08 and a hydroxyl equivalent of 1170. This product was extended with an equivalent amount of methylene bis (4-phenyl isocyanate) to form a rubbery material which had a dilute solution viscosity of 0.71.

EXAMPLE VIII

The reaction procedure used in this example was essentially the same as that used in Example I with the exception that a small amount of naphthalene was added to the reaction vessel after the addition of solvent and lithium metal. 1330 parts of tetrahydrofuran, 5.7 parts of finely divided lithium metal, 0.7 parts of naphthalene were charged to the reactor and dispersed pridor to the start of the butadiene feed. A total of 355 parts of butadiene were added over a period of 5 hours at temperatures around −40° C. The reaction was terminated by the addition of 60 parts of ethylene oxide to the reactor. From the reactor 333 parts of a viscous oil having a hydroxyl equivalent of 763 were recovered. This product was extended with an equivalent of methylene bis (4 phenyl isocyanate) to yield a rubber which was curable with sulfur. When acetone or fomaldehyde is substituted for ethylene oxide, the resulting functional compounds contains two more and two less carbon atoms than when ethylene oxide is used.

EXAMPLE IX

In this example 356 parts of diethyl ether, 4.2 parts of finely divided lithium metal, 44 parts of 2,3 diemthylbutadiene were charged to the reactor using the technique described in Example I. The reaction was terminated by the addition of 44 parts of ethylene oxide. A viscous oil which had a hydroxyl equivalent of 195, an iodine number of 274 (mg/gram basis) and an ebullioscopic molecular weight of 371 was recovered from the reactor. A carbon and hydrogen analysis on this product showed it to contain 76.83% carbon and 11.48% hydrogen on a weight basis. This product was reacted with an equivalent amount of 3,3'-bitolyl-4,4'-diisocyanate to give a hard pale polymeric material.

EXAMPLE X

In this reaction isoprene was the monomer and diethyl ether the solvent. To the reaction vessel were added 713 parts of diethyl ether and 2.8 parts of finely divided lithium metal. Isoprene (109 parts) was added gradually over a period of 5 hours at temperatures around 28° C. A portion (40%) of the reaction product was forced with helium pressure onto an excess of dry ice. To the rest of the reaction mixture were added 44 parts of ethylene oxide. From the reaction products with carbon dioxide were isolated 40 parts of a very viscous oil having a neutralization equivalent of 2160, iodine number of 316, a carbon and hydrogen content of 86.25 and 11.21% by weight, respectively. A cyclohexane solution (3.01 grams polymers per 100 grams of solvent) showed a cryoscopic molecular weight of about 4540. The ethylene oxide reaction product yielded 77 parts of a very viscous oil having a hydroxyl equivalent of 2025, and an iodine number of 309. A cyclohexane solution (2.20 grams/100 grams of solvent) showed a cryoscopic molecular weight of about 4070. When propylene oxide is substituted for ethylene oxide, the resulting functional compound has a corresponding molecular weight.

The hydroxyl terminated polymerized butadiene of this invention contains about 60-90%, 1,2-ethylenic units (C=C) and 10-40%, 1,4-ethylenic units. The hydroxyl terminated polyisoprene of this invention has about 10-40%, 1,2-ethylenic units, 40-70% 3,4-ethylenic units and 0-40% 1,4-ethylenic units.

While certain representative embodiments and details have been shown for the purpose of illustrating the invention, it will be apparent to those skilled in this art that various changes and modifications may be made therein without departing from the spirit or scope of the invention.

What is claimed is:

1. A hydroxyl-terminated polymeric hydrocarbon having a molecular weight within the range of 370 to 9900 and the structure HO—CH$_2$—CH$_2$—M—CH$_2$—CH$_2$—OH wherein M consists of isomeric 2-alkadiene units having the following structures

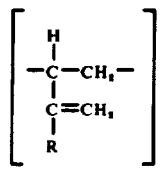
(I)

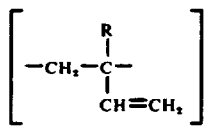
(II)

and

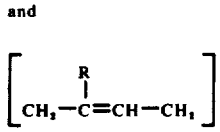
(III)

about 40-70% of the total number of said 2-alkadiene units in M being (I) units, about 10-40% being (II) units, and 0-40% being (III) units; R is a C$_1$ to C$_8$ alkyl radical.

2. A hydroxyl-terminated polymeric hydrocarbon having a molecular weight within the range of 370 to 9900 and the structure HO—CH$_2$—CH$_2$—M—CH$_2$—CH$_2$—OH wherein M consists of isomeric 2-alkadiene units having the following structures

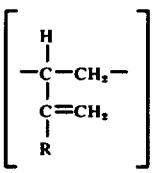
(I)

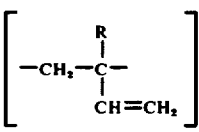
(II)

and

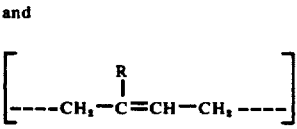
(III)

about 40-70% of the total number of said 2-alkadiene units in M being (I) units, about 10-40% being (II) units, and the remainder being (III) units; R is a C$_1$ to C$_8$ alkyl radical.

3. A process for producing relatively high molecular weight difunctional polydienes of at least 370 molecular weight consisting essentially of (A) reacting finely divided lithium metal with isoprene in a solvent to form a lithium metal polymeric diene adduct, the ratio of lithium to isoprene being in the range of 1 to 2 to about 1 to 26 at a temperature less than 30° C., (B) immediately after the formation of the lithium metal polymeric diene adduct reacting said adduct with a functionality imparting compound to form a lithium polymeric compound, (C) treating the lithium polymeric compound to replace lithium with hydrogen to yield a compound characterized by high reactivity with an organo diisocyanate to yield a polyurethane having a dilute solution viscosity of at least about 0.4, said solvent comprisng at least 60 percent by weight of an ether, said ether being selected from the class consisting of diethyl ether, tetrahydrofuran and dimethoxyethane, and said functionality imparting compound being selected from the class consisting of carbon dioxide, propylene oxide, alkanals of less than 5 carbon atoms, alkanones of less than 5 carbon atoms, and carbon disulfide.

* * * * *